May 26, 1925.
J. R. SNYDER
REBOUND CONTROLLER
Filed Aug. 20, 1923
1,539,063
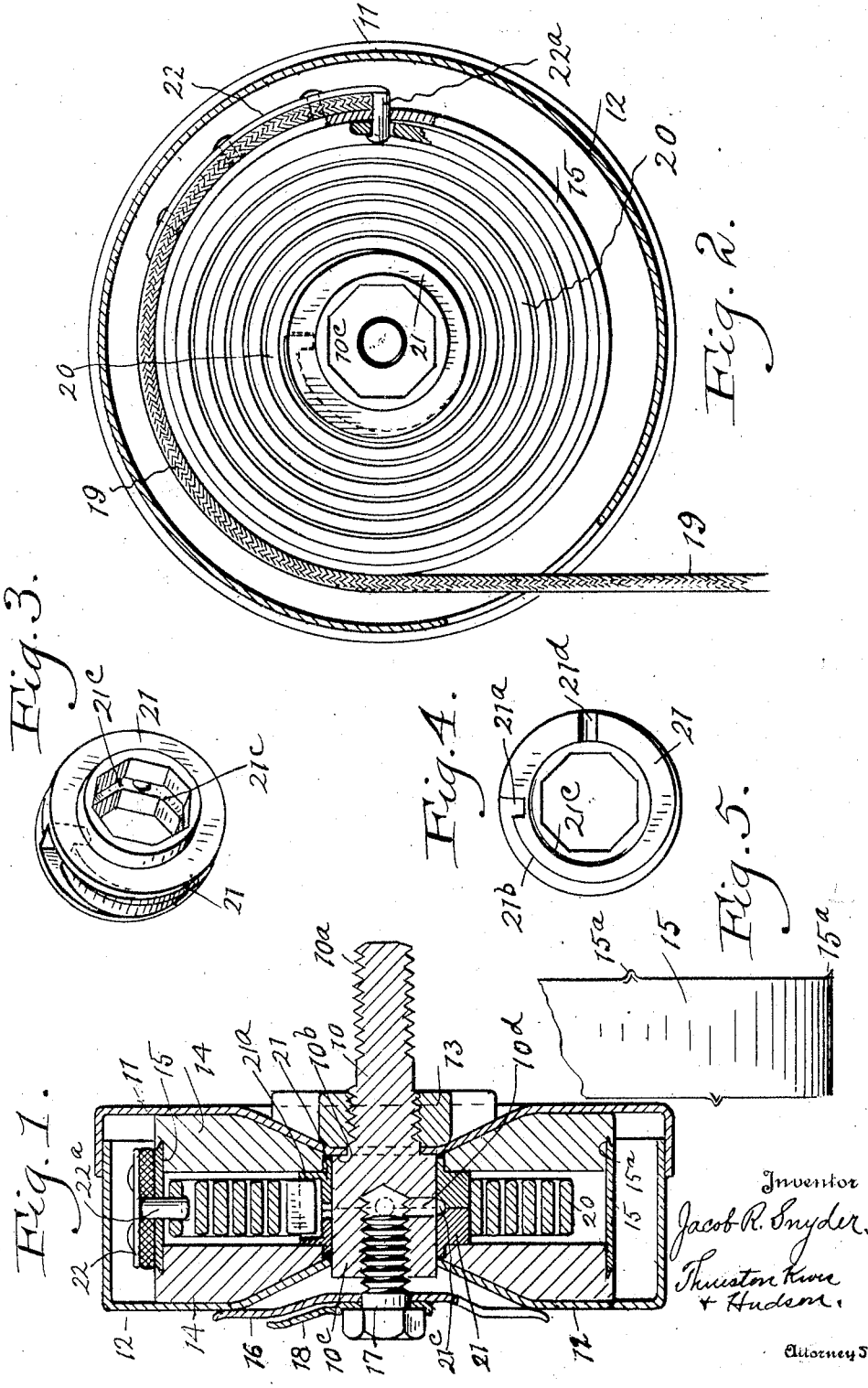

Patented May 26, 1925.

1,539,063

UNITED STATES PATENT OFFICE.

JACOB R. SNYDER, OF CLEVELAND, OHIO, ASSIGNOR TO THE STAR REBOUND CONTROLLER COMPANY, OF CLEVELAND, OHIO, A CORPORATION OF OHIO.

REBOUND CONTROLLER.

Application filed August 20, 1923. Serial No. 658,198.

*To all whom it may concern:*

Be it known that I, JACOB R. SNYDER, a citizen of the United States, residing at Cleveland, in the county of Cuyahoga and State of Ohio, have invented a certain new and useful Improvement in Rebound Controllers, of which the following is a full, clear, and exact description.

This invention relates to rebound controllers or snubbers for the purpose of checking sudden relative movement between two bodies. More particularly, the invention relates to a rebound controller for motor vehicles, to check the rebound or expansion movement of the main springs following compression thereof.

The principal object of the invention is to provide a controller which is efficient or effectively checks the rebound movement without affecting the compression movement. Further the invention aims to provide a controller such as described, which is durable and simple in construction, and in which wear and the liability of derangement of parts is reduced to a minimum, and which can be produced inexpensively.

The above and other objects are attained by my invention which may be here briefly summarized as consisting in certain novel details of construction, and combinations and arrangements of parts which will be described in the specification and set forth in the appended claims.

In the accompanying sheet of drawings wherein I have shown one embodiment of the invention, Fig. 1 is a sectional view through the controller, the plane of the section being through the axis of the rotary drum; Fig. 2 is a sectional view at right angles to the section of Fig. 1, this view showing in elevation the spiral spring which is housed within the hollow drum; Fig. 3 is a perspective view of the holder for the inner end of the spring; Fig. 4 is a view in elevation of one-half of the same; and Fig. 5 is a fragmentary elevation of a portion of an annular band which forms part of the periphery of the drum, and to which the end of a spiral spring and the end of a flexible band or strap which form parts of the controller are attached.

The rebound controller of the present invention is of that type which comprises a frictionally resisted rotary drum designed to be supported, usually on the chassis of the vehicle, and a strap or band adapted to be wound onto and unwound from the drum, and at its outer end to be attached usually to the axle of the vehicle.

The controller includes a stationary center bolt or stud 10 having a lateral projecting threaded portion 10ª designed to be secured to the chassis frame. Non-rotatably supported on this center bolt is a casing, preferably annular in form, and preferably composed of two telescoping parts 11 and 12. Preferably the inner portions of both halves of the casing are inclined inwardly, the outer portions between the inwardly inclined portions and the periphery being parallel or substantially parallel as shown. The part 11 of the casing is in this instance clamped against a shoulder 10ᵇ of the center bolt by a nut 13 which is partly received within the cavity formed by the inclination of the center portion of this part of the casing. The other part 12 of the casing is fitted onto the end of an enlarged portion 10ᶜ of the center bolt, and may be held from rotating thereon in any suitable manner.

Inside the casing and rotatable about the enlarged portion 10ᶜ of the center bolt 10 is a drum, which in this instance is hollow, and is composed of two side members 14, preferably of self lubricating oil impregnated hard wood, and a peripheral annular metal band 15 suitably attached to the outer portions of the drum members 14. In this instance the marginal portions of the band 15 are seated in peripheral recesses of the parts 14, and the three members are fastened together by means of prongs 15ª projecting laterally from the edges of the band. Any other suitable way of fastening the band 15 to the members 14 may, however, be utilized.

The outer sides of the drum members 14 bear against, and, in fact, are in frictional engagement with the sides of the casing members 11 and 12, to the contour of which, the outer faces of the drum members conform. The inner tapered portions of the casing members 11 and 12 form chiefly, if not entirely, the bearing for the drum, this being desirable for several reasons, among which may be mentioned the fact that as the bore of the drum is not required for bearing purposes there is a constant self alignment or centering which in no respect is affected by wear. Incidentally it might be mentioned that no drum lubrication is required.

The parts 11 and 12 not only perform the usual function of an enclosing casing, but as just stated above, they form the bearing for the drum, and in addition they serve as friction members to frictionally resist the rotation of the drum in both directions. The frictional resistance which may be adjusted to suit requirements, is accomplished through the medium of an external spring or spring disk 16 which is supported on the shank of a bolt 17 screwed into a threaded socket of the center bolt, this spring spanning the concavity on one side of the device and bearing against the casing member 12 so as to press it and the drum inwardly toward the relatively fixed casing member 11, and to cause the inner surfaces of the two casing members to bear with the requisite pressure against the outer sides of the drum. By adjusting the bolt 17, the tension of the spring, and hence the degree of frictional resistance to the rotation of the drum can be varied. I prefer to provide on the bolt next to the head thereof, so as to rotate therewith, an indicator 18 adapted, through the co-operation of suitable indicating indicia on the spring 16, to indicate the tension imposed in the spring 16 by the bolt 17.

Adapted to be wound onto and unwound from the peripheral band 15 of the drum is a flexible strap 19 which extends out through an opening in the periphery of the drum, as shown in Fig. 2, and at its outer end is adapted to be attached to the axle of the vehicle, assuming that this device is used as a rebound check for vehicles, the strap being unwound from the drum during the rebound movement, and being wound onto the drum during the compression movement of the main springs of the vehicle. To wind the strap onto the drum, i. e., to take up slack during the compression movement of the main springs, or when the body and axle approach each other. I employ a spiral spring 20 which is located inside the drum. The inner end of the spring is connected to a spring support 21, which is non-rotatably seated upon the enlarged part 10ᶜ of the center bolt, and the outer end of the spring as well as the inner end of the flexible strap 19 are secured to the band 15 of the drum. While the end of the band and the end of the spring can be fastened to the band 15 of the drum in different ways, and separately, if desired, I prefer for the sake of simplicity and cheapness to accomplish this as herein illustrated, by means of a short strap or clip 22 which is riveted to the end portion of the flexible strap 19, and is provided at the end of the strap 19 with an inwardly projecting stud 22ᵃ which is extended through an opening in the band 15 and is connected to the outer end of the spring as shown in Fig. 2. Preferably the end of the spring has an opening which is slipped onto the end of the stud 22ᵃ, the latter having a hook-like extension which prevents accidental disengagement of these parts. By this simple expedient, the drum, strap and outer end of the spring move in unison, the spring being wound up when the strap is pulled out as the axle and body move away from each other, and serving to wind the strap onto the drum as they approach each other. That is to say, the rebound movement is opposed by the frictional resistance of the casing members on the drum, and by the tension of the spiral spring 20, the frictional resistance being constant (for any given adjustment of the bolt 17) but the resistance provided by the spiral spring gradually increasing as the rebound movement continues. On the other hand, during the compression movement of the main spring, or when the vehicle body and axle approach each other, the movement of the drum is resisted simply by the frictional resistance of the casing members thereon, but the spiral spring is sufficiently strong to overcome this and to instantly wind the strap onto the drum so as to keep the slack out of the strap just as soon as the tension or outward pull on the strap becomes less than the opposing pull exerted by the spring.

The spring support 21 which is interlocked with the inner end of the spring may be held from rotating on the enlarged portion of the center bolt 10ᶜ in any suitable manner. In this instance the bolt enlargement 10ᶜ is of irregular shape, here octagonal, and the inner bore of the spring support is shaped to conform to it.

In order that the end of the spring may be effectively fastened to the spring support 21, and in order that the latter may support the inner convolution of the springs so as not to result in the breakage of the latter at the end of the first complete convolution of the spring, or where the spring overlaps the inner end thereof, the support is provided with a depression 21ᵃ in which the extreme end of the spring is seated, as shown in Fig. 2, the end of the spring being given an inward right angle bend, and leading from this depression the support has a spiral portion of gradually increasing radius. Otherwise stated, the support has a spiral groove which gradually deepens as it approaches the depression 21ᵃ, the depth of the groove next to the depression being equal to the thickness of the spring so that when the spring is tightly wound up, the inner part thereof has a continuous support where the spring overlaps or passes over the end fastened to the supporting member 21.

For convenience in forming the spring support 21, with the depression 21ª and the spiral groove leading therefrom, and particularly for convenience in assembling the elements, the spring support 21 is preferably formed of two component parts, best illustrated in Fig. 1.

It will be observed that the spring support is provided at its ends with short flange-like extensions on which the narrow inner part of the drum members 14 bear, but as previously explained, these are not essential for the proper support of the drum.

Though no lubrication is required for the drum, it is desirable that a lubricant be supplied for the spring to keep it quiet in action, but as the spring is housed within the drum, one supply of lubricant will suffice for a long period of use. I prefer that the lubricant be supplied through the socket in the center bolt which receives the adjusting bolt 17, and in order that the lubricant, which can be supplied to the socket by a grease gun, may pass to the interior of the drum, the center bolt is provided with one or more axially extending openings 10ᵈ leading from the threaded socket, and the spring support is provided with an internal groove 21ᶜ (see particularly Figs. 1 and 3) from which groove one or more openings 21ᵈ (see Fig. 4) lead outwardly to the periphery of the spring support.

Above I have described the preferred construction of my improved rebound controller. The embodiment illustrated and described is efficient, but at the same time it is inexpensive to produce, and has practically the simplest possible construction. Likewise, compactness is obtained to a very high degree and durability is also obtained to a marked extent.

Though I have shown the preferred construction, I do not desire to be confined to the precise details shown, but aim in my claims to cover all modifications which do not involve a departure from the spirit and scope of my invention as defined in the appended claims.

Having described my invention, I claim:

1. In a rebound controller, a rotatable drum, a strap adapted to be wound onto and unwound from the drum, a spring for winding the strap onto the drum and yieldingly resisting its unwinding, and a casing enclosing the drum and having side portions frictionally engaging the drum to resist its rotation.

2. In a rebound controller, a rotatable drum, a strap adapted to be wound onto and unwound from the drum, a spring for winding the strap onto the drum and yieldingly resisting its unwinding, and a pair of friction members engaging the sides of the drum and serving as a support therefor.

3. In a rebound controller, a rotatable drum, a strap adapted to be wound onto and unwound from the drum, and a spring for winding the strap onto the drum and yieldingly resisting its unwinding, the drum being hollow and the spring being housed therein, and the drum having bearing portions of self lubricating material.

4. In a rebound controller, a drum, a strap adapted to be wound onto and unwound from the drum, a spring for rotating the drum in one direction so as to wind the strap thereon, and a casing enclosing the drum and having side portions serving to support the drum and to frictionally resist its rotation.

5. In a rebound controller, a drum, a strap adapted to be wound onto and unwound from the drum, a spring for rotating the drum in one direction so as to wind the strap thereon, and a casing composed of relatively movable parts pressed against opposite sides of the drum.

6. In a rebound controller, a drum, a strap adapted to be wound onto and unwound from the drum, a spring for rotating the drum in one direction so as to wind the strap thereon, and a casing composed of relatively movable parts pressed yieldingly against opposite sides of the drum.

7. In a rebound controller, a drum, a strap adapted to be wound onto and unwound from the drum, a spring for rotating the drum in one direction so as to wind the strap thereon, a casing composed of relatively movable parts pressed yieldingly against opposite sides of the drum, and means for adjusting the degree of pressure between the casing parts and drum.

8. In a rebound controller, a drum, a strap adapted to be wound onto the drum and to be unwound therefrom, and a spring for rotating the drum in one direction, said drum comprising self lubricating members housing the spring.

9. In a rebound controller, a stationary center bolt and casing, a hollow drum rotatably supported to turn about the center bolt and composed of side and peripheral portions, the side portions of the drum being frictionally engaged exteriorly to resist its rotation, a strap adapted to be wound onto and unwound from the peripheral portion of the drum, a spring housed within the drum and composed of superposed turns or convolutions located between the side portions of the drum, the inner end of the spring being fixed and the outer end being attached to the peripheral portion of the drum, and means for supplying lubricant through the center bolt to the interior of the drum.

10. In a rebound controller, a rotatable drum, a strap adapted to be wound onto the drum and to be unwound therefrom, and a spring for rotating the drum in one direction, said drum being composed of a pair of side members and an intervening peripheral member adapted to receive the strap.

11. In a rebound controller, a rotatable drum, a strap adapted to be wound onto the drum and to be unwound therefrom, and a spring for rotating the drum in one direction, said drum being composed of a pair of side members and an intervening peripheral member to which the inner end of the strap and the outer end of the spring are attached.

12. In a rebound controller, a drum, a strap adapted to be wound onto the drum and to be unwound therefrom, and a spring for rotating the drum in one direction, said drum being composed of a pair of self lubricating side members and a peripheral member to which the inner end of the strap and the outer end of the spring are connected, the spring being housed within the drum.

13. In a rebound controller, a rotatable drum, a strap adapted to be wound onto the drum and to be unwound therefrom, and a spring for rotating the drum in one direction, said drum being hollow and receiving the spring and composed of two opposite side portions and an intermediate peripheral portion, and the inner end of the strap and the outer end of the spring being connected to each other and to the drum through the peripheral portion thereof.

14. In a rebound controller, a stationary center bolt, a hollow drum rotatable about the axis thereof, a spring housed within the drum, a strap adapted to be wound onto and unwound from the periphery of the drum, the center bolt having means whereby lubricant may be supplied to the interior of the drum.

15. In a rebound controller, a stationary center bolt, a hollow drum rotatable about the axis thereof, a spring housed within the drum for rotating the drum in one direction, a strap engaging the periphery of the drum, the center bolt having a support for the inner end of the spring, and said center bolt having means whereby lubricant may be supplied to the interior of the drum through said spring support.

16. In a rebound controller, a drum, a strap adapted to be wound onto and unwound from the drum, a spring for rotating the drum in one direction, the drum having on opposite sides inwardly tapered center portions, and means frictionally engaging both tapered portions of the drum.

17. In a rebound controller, a casing having inwardly inclined middle portions on opposite sides, a rotatable drum within the casing and having on opposite sides inwardly tapered portions engaging said inwardly inclined portions of the casing, a strap engaging the periphery of the drum, and a spring for rotating the drum in one direction.

18. In a rebound controller, a casing having inwardly inclined middle portions on opposite sides, a rotatable drum within the casing and having on opposite sides inwardly tapered portions engaging said inwardly inclined portions of the casing, a strap engaging the periphery of the drum, a spring for rotating the drum in one direction, and means for yieldably pressing the sides of the casing and drum together.

In testimony whereof, I hereunto affix my signature.

JACOB R. SNYDER.